United States Patent [19]
O'Neill et al.

[11] Patent Number: 6,149,228
[45] Date of Patent: Nov. 21, 2000

[54] MODULAR OPERATOR ENCLOSURE

[75] Inventors: Michael Jerome O'Neill, Mayville, Wis.; John Louis Bocksnick, Willow Springs, N.C.; Michael Perry Reimer, Morden, Canada; Leon Roy Friesen, Morden, Canada; Irvin Goertzen, Morden, Canada

[73] Assignee: Deere & Company, Moline, Ill.

[21] Appl. No.: 09/207,989

[22] Filed: Dec. 9, 1998

[51] Int. Cl.$^7$ ........................................................ B60J 7/00
[52] U.S. Cl. ............................... 296/190.03; 296/190.01; 296/190.08; 296/190.1; 296/190.11
[58] Field of Search ........................ 296/190.01, 190.03, 296/190.08, 190.1, 190.11

[56] References Cited

U.S. PATENT DOCUMENTS

| | | | |
|---|---|---|---|
| 2,583,918 | 1/1952 | Wilson | 296/190.1 |
| 2,997,333 | 8/1961 | Kauffman et al. | 296/28 |
| 3,443,833 | 5/1969 | Miller et al. | 296/102 |
| 3,451,713 | 6/1969 | Hollingshead | 296/190.03 |
| 3,632,134 | 1/1972 | Babbitt | 296/190.03 |
| 3,690,720 | 9/1972 | Whisler | 296/28 C |
| 3,787,085 | 1/1974 | Bucher et al. | 296/190.03 |
| 3,841,430 | 10/1974 | Babbitt | 296/190.03 |
| 4,009,901 | 3/1977 | Barbee | 296/190.1 |
| 4,023,851 | 5/1977 | Palmar et al. | 296/190.08 |
| 4,050,735 | 9/1977 | Molnar | 296/102 |
| 4,101,160 | 7/1978 | Mounts et al. | 296/35 R |
| 4,135,756 | 1/1979 | Hausmann | 296/190.03 |
| 4,184,712 | 1/1980 | Skahill | 296/190.03 |
| 4,368,797 | 1/1983 | Van Der Lely | 296/190.1 |
| 4,408,672 | 10/1983 | Albright et al. | 296/190.03 |
| 4,443,035 | 4/1984 | Saemann | 296/190 |
| 4,624,500 | 11/1986 | Heitman | 296/190.1 |

(List continued on next page.)

OTHER PUBLICATIONS

Deere & Company employees, 4 photos on 2 pages of Caterpillar D5H LGP, 1998, U.S.A.
Deere & Company, F1145/F900 Series Front Mowers, 4 pages, publication date—1994, published in U.S.A.
Harris Stolper Inc., Harris Cabs for Toyota Forklifts, 4 pages, publication date—unknown, published in Canada.
Walter Mauser GmbH, Comfort Cabs Vehicle Components, 20 pages, publication date—unknown, publication location unknown.
The Toro Company, Toro® Commerical Equipment Guide for the Turf Professional, 8 pages, publication date—1997, published in the U.S.A.
Ford New Holland, Inc., Ford Commerical Front Mowers CM224 CM274, 2 pages, publication date—1990, published in U.S.A.
Kubota Tractor Canada Ltd., Kubota Diesel 4WD Tractor F2000, 2 pages, publication date—Jun. 1987, published in Japan.
The Toro Company, Toro® Reelmaster® 5100–D, 2 pages, publication date—1992, published in U.S.A.

(List continued on next page.)

*Primary Examiner*—Joseph D. Pape
*Assistant Examiner*—Kiran Patel

[57] ABSTRACT

A modular operator enclosure is provided for a wheeled vehicle such as a front mount mower or utility vehicle. The enclosure is provided with interconnected front and rear roll-bar structures which serve as a framework upon which a variety of enclosure elements can be attached. Selectively attachable to the framework are a roof element, a front windshield, rear and/or side windows and doors. Glass and metal or flexible windshields, windows and doors are available to meet differing use and weather needs. The module and its elements are quickly and easily assembled at the dealership, thereby enabling them to be shipped in a compact form. The module design provides the dealership and/or user with the option of initially equipping the enclosure with a minimum of elements and then later adding or changing the elements to thereby minimize cost and/or effort.

27 Claims, 9 Drawing Sheets

U.S. PATENT DOCUMENTS

| | | | |
|---|---|---|---|
| 4,652,037 | 3/1987 | Thau et al. | 296/78 R |
| 4,664,699 | 5/1987 | Chandler et al. | 296/190.11 |
| 4,669,565 | 6/1987 | Miki et al. | 296/190.03 |
| 4,675,933 | 6/1987 | Martin | 296/190.1 |
| 4,688,846 | 8/1987 | Martin | 296/190.08 |
| 4,702,516 | 10/1987 | Martin | 296/190.1 |
| 5,002,332 | 3/1991 | Ikeda | 296/190.11 |
| 5,064,242 | 11/1991 | Fujan et al. | 296/190.03 |
| 5,280,955 | 1/1994 | Nelson et al. | 296/190.03 |
| 5,882,063 | 3/1999 | Job | 296/190.03 |

OTHER PUBLICATIONS

Ford Tractor Operations, Ford Rollover Protective Structures, 10 pages, date stamped Feb. 1983, published in U.S.A.

Steelcraft Tractor Equipment Co., New Type "Steelcraft" All–Weather Cab, 1 page, publication date—1946, published in U.S.A.

MODULAR OPERATOR ENCLOSURE

BACKGROUND OF THE INVENTION

1. Field of the Invention

The present invention relates to an operator enclosure for vehicles such as front mount mowers, and more specifically to a modular enclosure design that permits the enclosures to be assembled in any of several configurations.

2. Description of Related Art

A variety of structures are provided as operator enclosures for vehicles such as front mount mowers. Some are designed to provide roll-over protection while others protect against the weather and environmental elements such as sunshine, rain, snow, dust, dirt and wind, but do not provide roll-over protection. Typically, these structures are available in the form of a roll-over protection structure or a completed cab with some completed cabs also incorporating the roll-over protection structure. Although some cabs with roll-over protection structures are available with optional windows and/or doors, it would be desirable to provide an operator enclosure which allows for the modular and selective assembly of various combinations of protective roll-over and environmental structures, either as originally installed equipment or as later added optional equipment.

SUMMARY OF THE INVENTION

Towards this objective, there is provided a modular operator enclosure which utilizes a rear and front roll-over structure as the framework upon which selected enclosure structures can be installed. The rear and front roll-over structures are adapted to permit the attachment of a roof member, flexible or glass front and/or rear windows, flexible or glass doors and/or side windows, headlights, front and/or rear windshield wipers and related convenience equipment such as a heater, beacon lamp, ventilation system, filter fan or turn signals.

The modular design permits the installation of the enclosure by the dealer rather than during manufacture of the vehicle, thereby allowing it to be equipped with only the features desired by the purchaser. Since the various enclosure structures can be packaged and shipped in compact bundles instead of as assembled cabs, shipment expenses are minimized as well.

Should an owner, subsequent to the original purchase, want to equip the enclosure with features it does not have, they can easily be added to the framework. Should the owner want to substitute metal and glass windows or doors for flexible structures, or vice versa, those modifications can also be made.

With the present invention, there is provided a modular operator enclosure assembly that offers a choice as to how a purchaser may choose to have the enclosure configured, that is less expensive to manufacture, ship and assemble, and one which allows the initial owner as well as subsequent owners the option of changing the protection and convenience features of the enclosure.

DESCRIPTION OF THE PREFERRED EMBODIMENT

Figure 1:
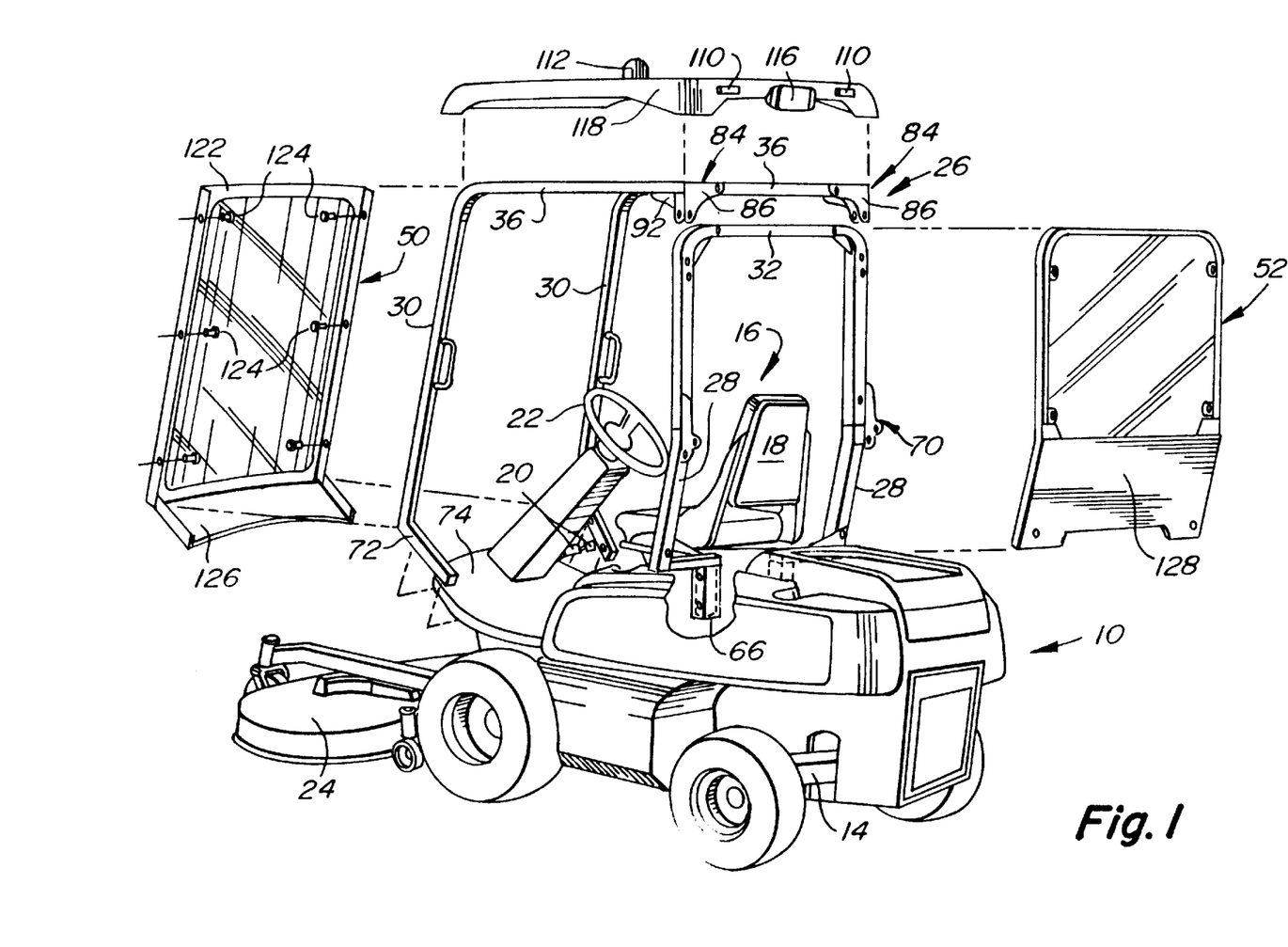
FIG. 1 is a left rear elevated perspective view of a front mount mower with an exploded view of the modular operator enclosure framework, roof member and front and rear windows.

Looking first to FIG. 1, there is illustrated a left rear elevated perspective view of a front mount mower 10 upon which the modular operator enclosure can be utilized. It is to be understood that the modular enclosure can also be utilized with other wheeled vehicles, such as the utility vehicle 12 illustrated in FIG. 2. The vehicles would include a power source such as a diesel or gasoline engine, a frame 14, an operator station 16, an operator seat 18 and foot and hand controls 20 and 22. The front mount mower 10 of FIG. 1 is also equipped with the capability at its forward end to support an implement such as a multiple spindle rotary mower deck 24.

Figures 5, 11:
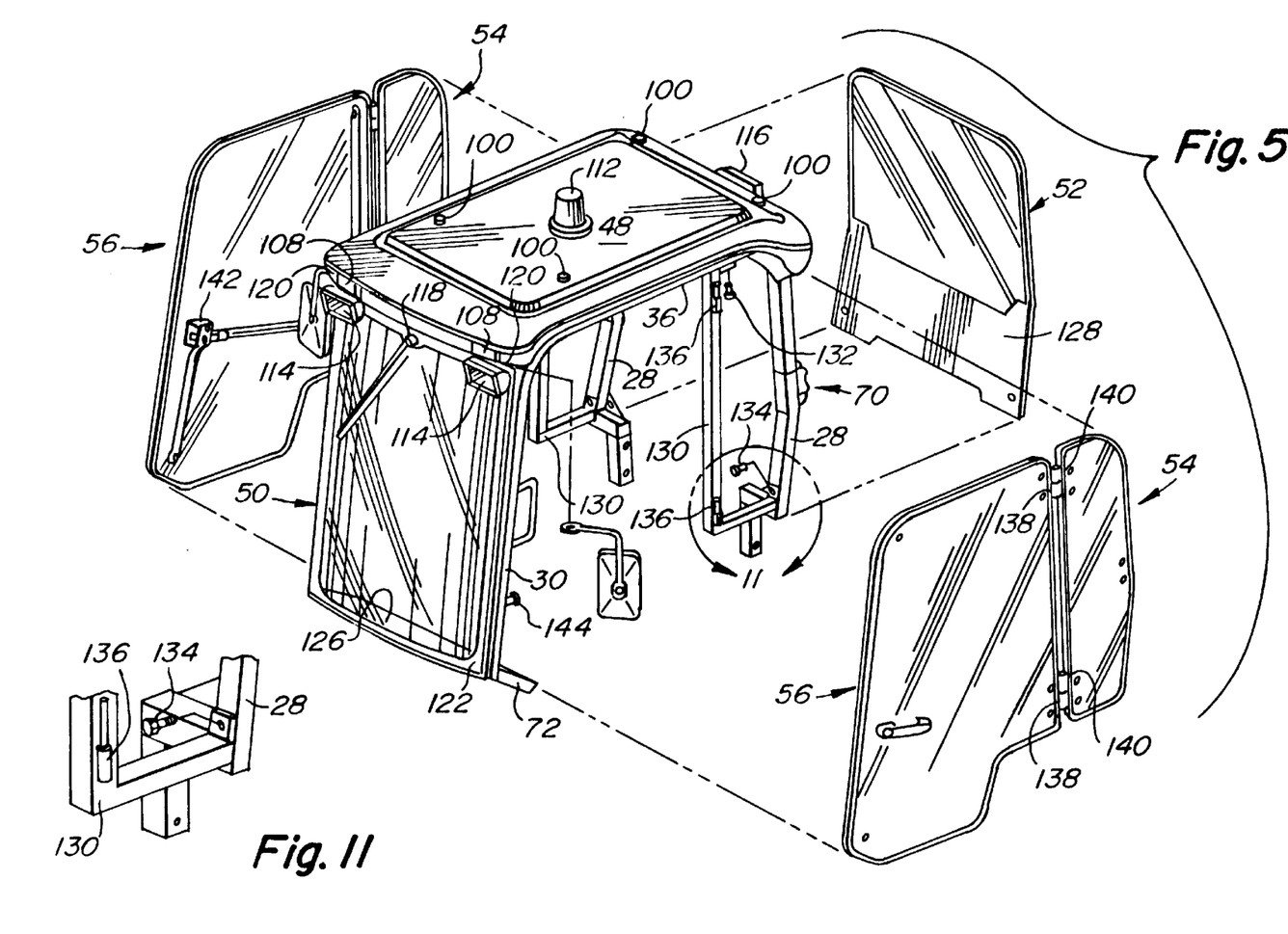
FIG. 5 is a left front elevated perspective view of the modular framework with the windshield and roof attached, and the glass doors, glass side and rear windows shown in an exploded fashion.
FIG. 11 is an enlarged view of the structure that attaches the bottom of a center leg member to the rear leg member.
Figure 6:
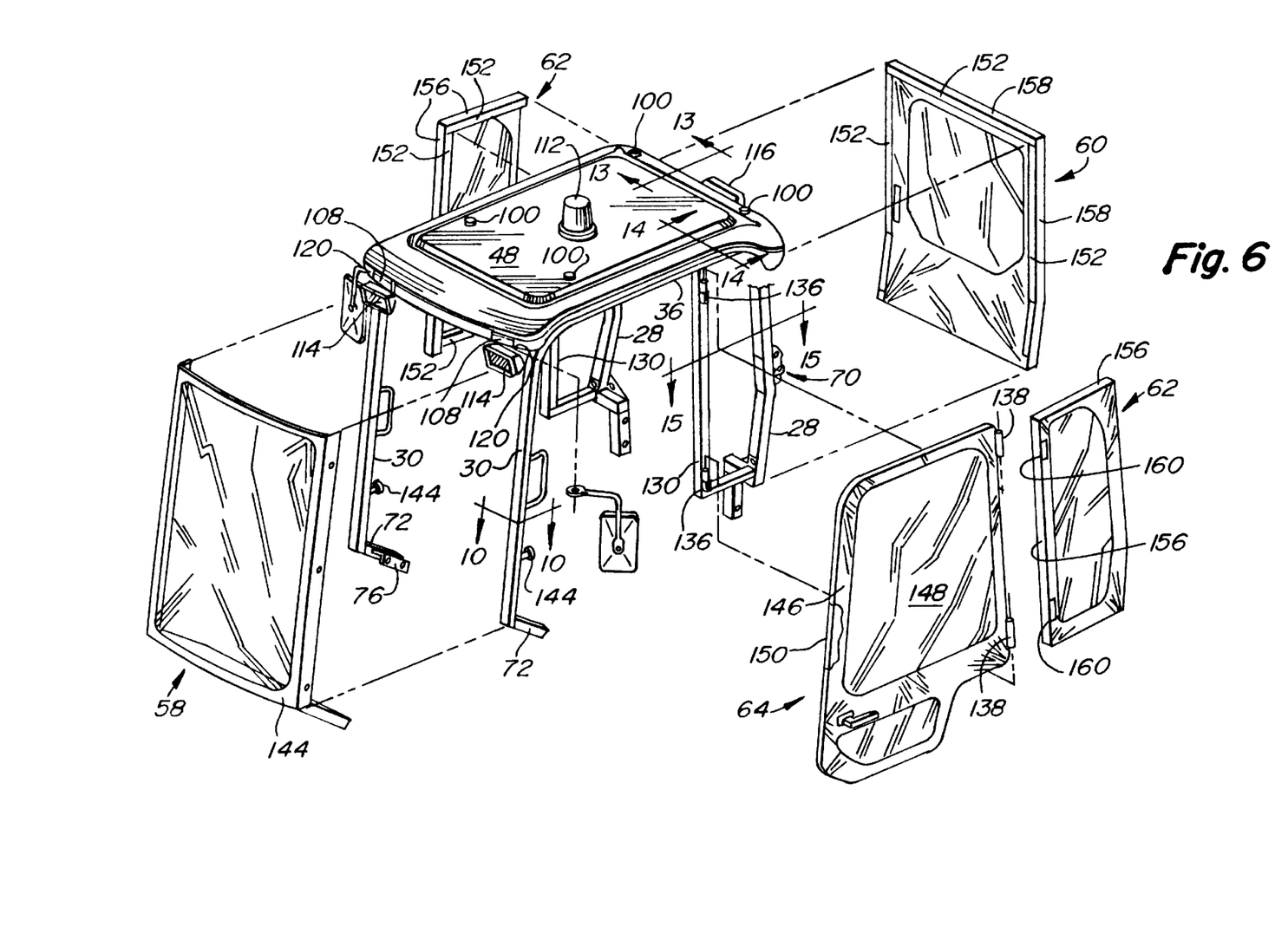
FIG. 6 is a view similar to FIG. 5, but illustrating a flexible door, front window and side and rear window members in an exploded fashion.

The framework 26 of the modular operator enclosure illustrated in FIGS. 1 and 3 through 5 includes first and second pairs of laterally spaced apart and generally vertically extending rear and front leg members 28 and 30, first and second laterally extending rear and front cross members 32 and 34 connecting the respective first and second pairs of leg members 28 and 30 and a pair of laterally spaced apart and fore-and-aft extending roof support members 36 connecting the rear and front leg members 28 and 30. These leg members 28 and 30, cross members 32 and 34 and roof support members 36 comprise the framework 26 for the operator enclosure that includes front 38, rear 40, left 42 and right 44 and top sides or faces 46, See FIG. 4. To these sides or faces can selectively be mounted a variety of modular elements such as a roof member 48, a windshield 50, a rear window 52, side windows 54 and/or doors 56, as shown for example in FIG. 5. The windshield, rear window, side windows and doors can be comprised of either glass or flexible materials. FIG. 5 illustrates the enclosure with a glass windshield or front window 50, glass rear and side windows 52 and 54 and glass doors or door members 56. FIG. 6 illustrates the enclosure with a flexible windshield or front window 58, flexible rear and side windows 60 and 62 and flexible doors or door members 64.

Figures 3, 4:
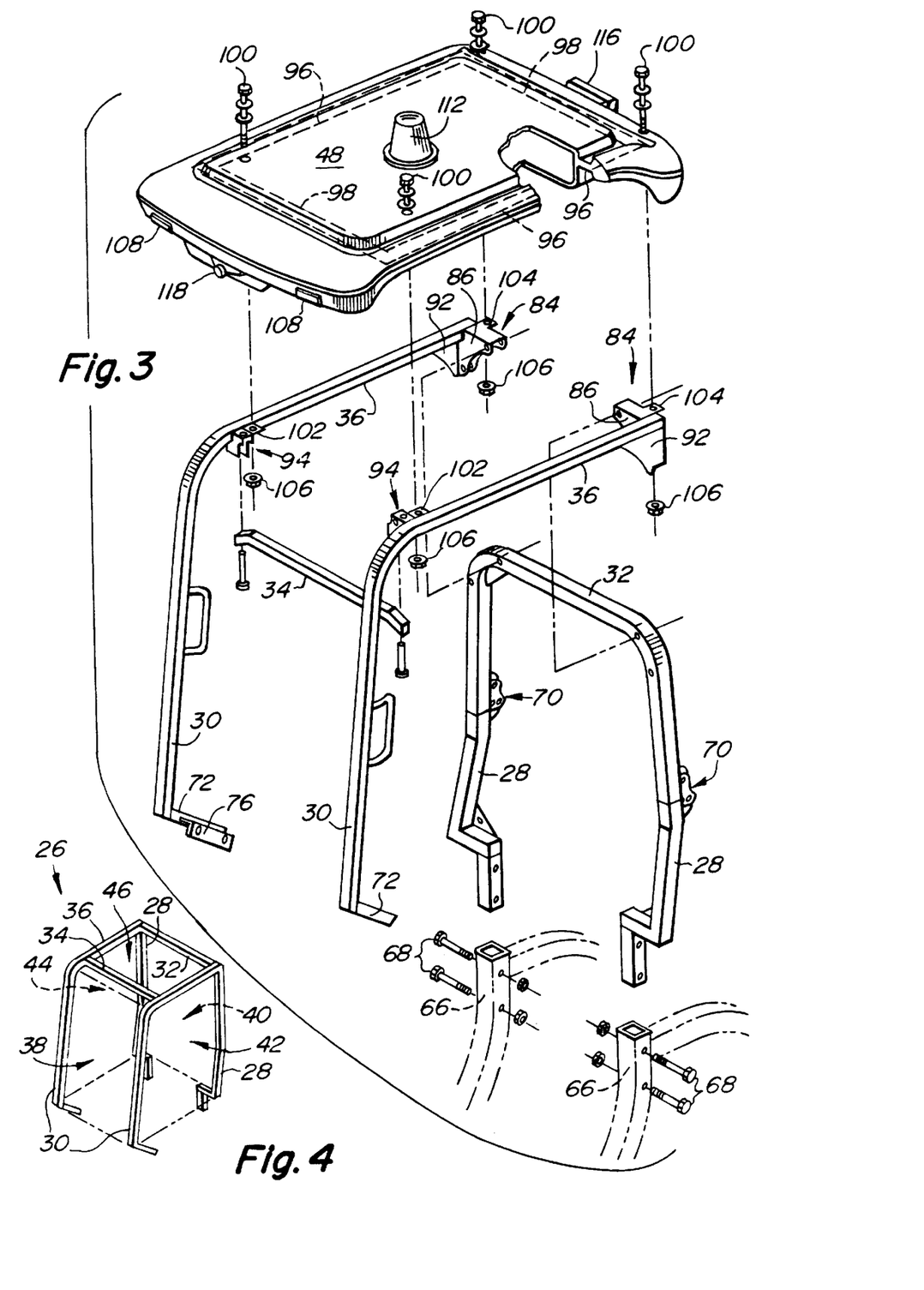
FIG. 3 is an exploded schematic and front elevated perspective view of the modular framework and roof member.
FIG. 4 is a schematic left front illustration of the modular framework formed by the front and rear leg and cross members and roof support members.

As shown in FIGS. 1 and 3, the rear or first leg members 28 are removably mountable in tubular sleeves 66 fixed to the vehicle frame. The lower portions of the rear leg members 28 are slidably received in the tubular sleeves 66 and bolts or similar fasteners 68 are used to secure them together. The rear leg members 28 and first cross member 32 in combination can also serve as a roll-over protection structure. A joint or hinge 70 can be provided in each rear leg member 28 to allow it to fold rearwardly. This joint 70 allows the vehicle, when it is equipped with just the rear leg members 28 and first cross member 32, to assume a lower profile and operate beneath tree branches or similar low hanging obstacles.

Figures 7, 8, 12:
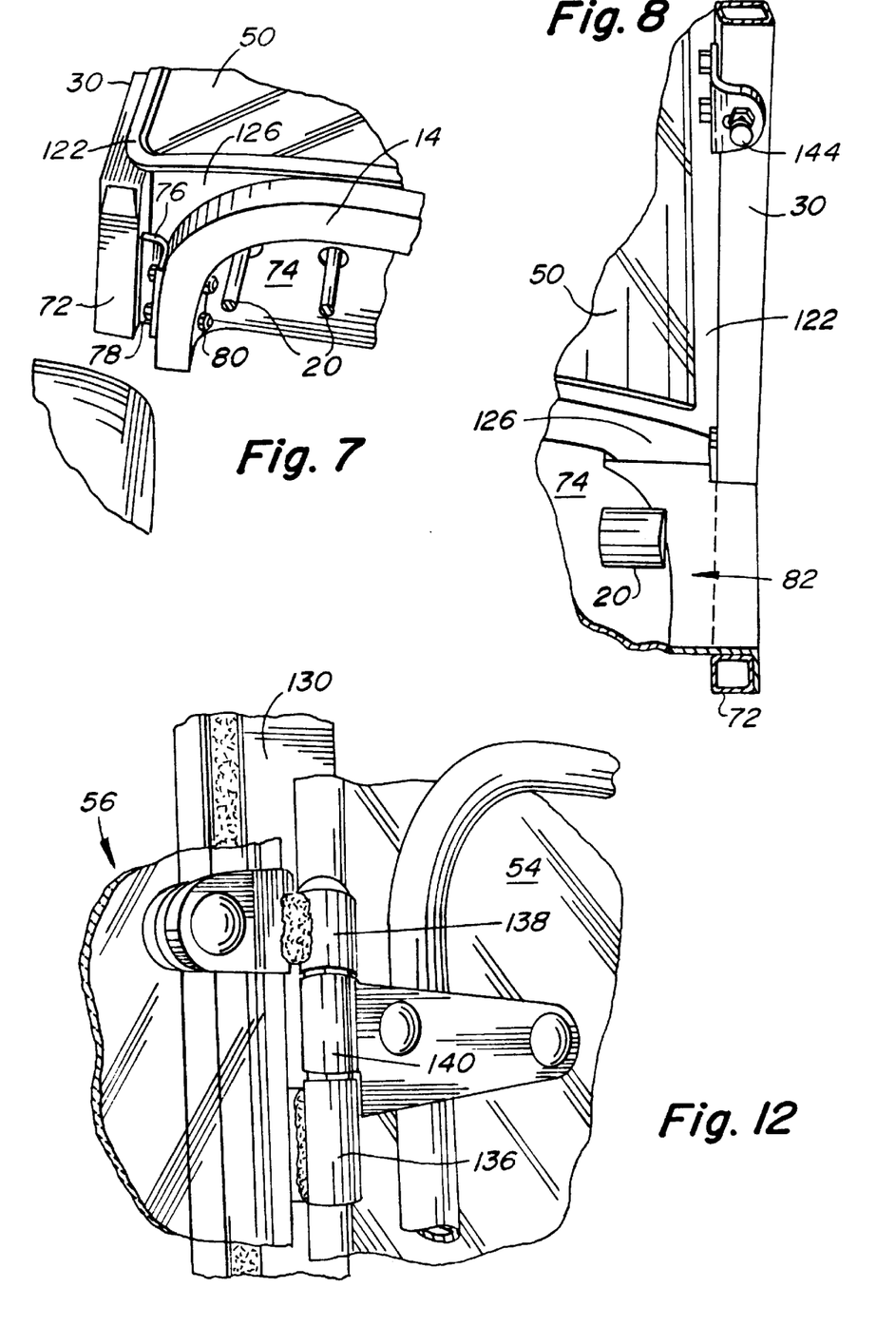
FIG. 7 is an enlarged view of the structure that attaches the front leg members with the vehicle frame beneath the floor pan on the right underneath side of the operator station.
FIG. 8 is an enlarged view illustrating a floor pan extension and door latch bolt structure.
FIG. 12 is an enlarged view illustrating one of the mounting pin structures that serve to support the glass door and glass side window.

The front or second pair of leg members 30 are provided with downwardly and rearwardly extending portions 72 that attach to the vehicle frame 14 beneath the level of the floor pan 74, See FIGS. 1 and 7. L-shaped brackets 76 are welded to each rearwardly extending portion 72 of a leg member 30 and bolts 78 and nuts 80 serve to secure the brackets 76 with a vehicle frame member 14 carried beneath the level of the floor pan 74. Since the floor pan 74 of the front mount mower 10 illustrated is of a lesser width than the enclosure, floor pan extensions 82 are added between the vehicle floor pan 74 and each front leg member 30, See FIG. 8. In the preferred embodiment, each of the front leg members 30 and its connected roof support member 36 is formed from a single tubular member, See FIG. 2. It is to be understood that these front leg and roof support members 30 and 36 could be fabricated from separate members and then secured together.

Figure 9:
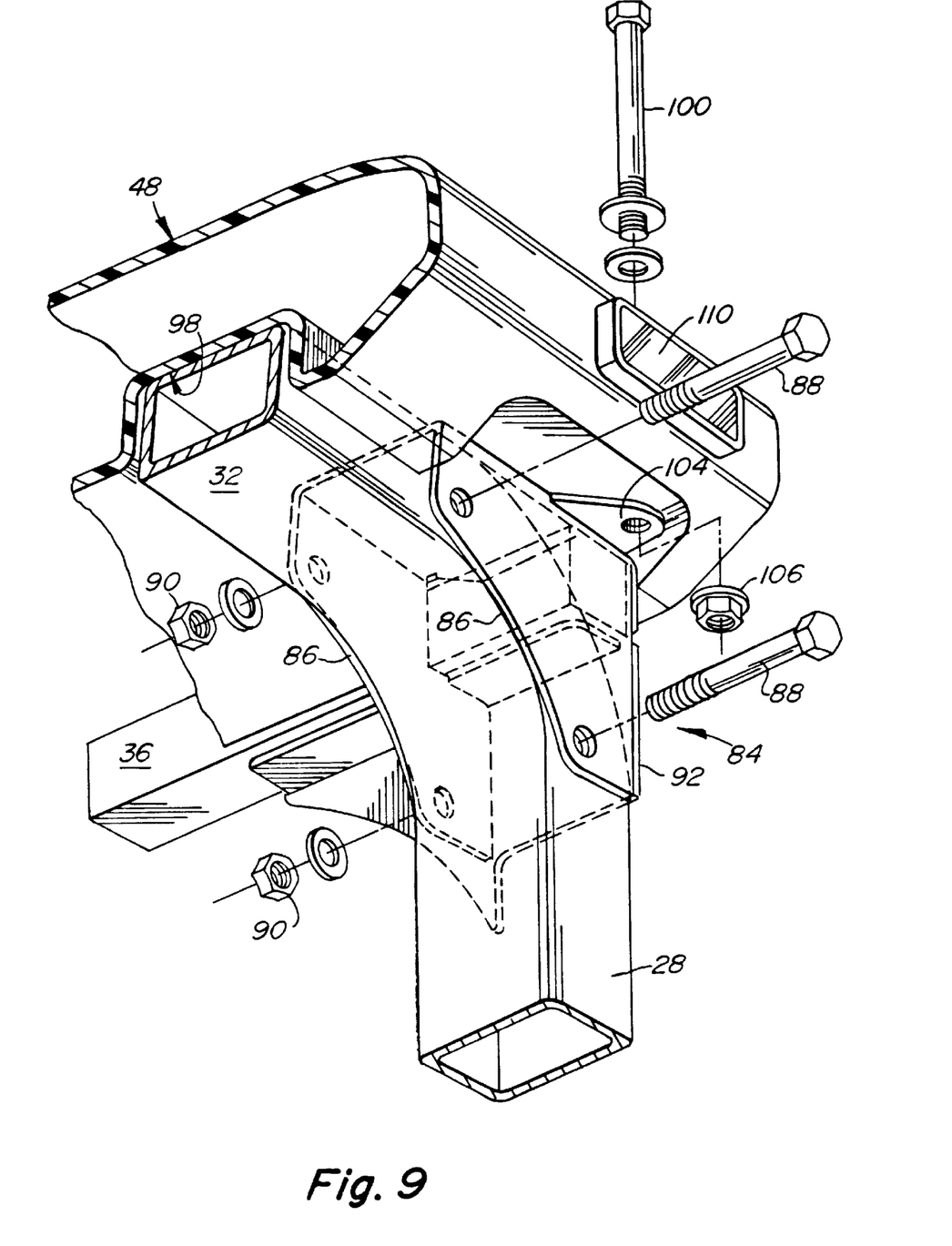
FIG. 9 is an enlarged rear perspective view illustrating the C-shaped bracket which secures each roof support member to the rear leg members and first cross member.

Looking now to FIGS. 1, 3 and 9, there is illustrated the interconnection between the roof support members 36 and the corners of the rear roll-over protection structure. As best shown in FIG. 9, a C-shaped bracket 84 is fixed as by welding to the rear portion of each roof support member 36. The fore-and-aft spaced vertical sides 86 of each C-shaped bracket 84 are then connected by bolts 88 and nuts 90 to the first cross member 32 and a first leg member 28. A vertically extending plate 92 is also fixed to each roof support member 36 to abut the outer vertical wall of a first leg member 28 and reinforce the connection between the two members 36 and 28.

Returning to FIG. 3, it can be seen that the second crossbar 34, which serves to brace the second or front leg members 30, is bolted to brackets 94 carried at the front end portion of each of the roof support members 36. The structural combination of the first and second cross members 32 and 34 and roof support members 36 provide the top side or face 46 of the modular framework 26 upon which the roof member can be selectively mounted.

The roof or roof member 48 in the preferred embodiment is made of synthetic material and formed by a rotomolding or vacuum-forming process to provide the desired shape. A fiberglass forming process could also be utilized. Formed along each fore-and-aft extending underside of the roof 48 as well as along the front and rear edges of the underside are channels 96 and 98, See FIG. 3, which are adapted to receive respectively the first and second cross members 32 and 34 and two roof support members 36. Bolts 100 are inserted into openings formed in the roof member 48 and project downwardly therethrough to be received in front tabs 102 carried by the front brackets 94 and rear tabs 104 carried by the C-shaped brackets 84. Nuts or similar fasteners 106 attach to the bolts 100 and secure the roof member 48 to the top face 46 of the framework 26. Optionally formed in or mounted to the roof 48 can be front and/or rear turn signals 108 and 110, a rooftop beacon 112, mounting structures for front and rear lights 114 and 116, a windshield wiper module 118, and rearview mirror mounts 120. Further provided within the underside of the roof can be air circulation and/or filtration devices.

Turning now to FIGS. 1 and 5, there is shown the glass windshield 50 in an exploded and installed view. The glass windshield 50 is preferably mounted within a metal frame 122 that can be quickly and easily secured to the second leg members 30 with bolts and/or similar fasteners 124, See FIGS. 1, 5 and 10. At the lower end of the windshield 50 is provided a flap 126 that serves as a seal between the window 50 and floor 74 of the vehicle. The lower edge of the flap 126 could be secured to the lower portions 72 of the front leg members 30.

As is also shown in FIG. 5, the glass and metal rear window 60 can be secured with bolts or similar fasteners to the rear or first leg members 28. In the preferred embodiment, a solid lower panel 128 is provided beneath the rear window 52 and directly behind the operator's seat 18.

To install side doors and/or windows, third leg members 130 are added to the vehicle midway between each pair of the first and second leg members 28 and 30, See FIGS. 5 and 6. The third or center leg members 130 are generally L-shaped and attach at their upper ends by bolts or similar fasteners 132 to a roof support member 36. Similarly, the lower and rear end portions of the center leg members 130 attach by bolts or similar fasteners 134 to the forward vertical surface of a rear leg member 28, See FIGS. 5 and 11. Each center leg member 130 also carries mounting pins 136 upon which the doors and/or side windows can be swingably mounted. With the center leg members 130 in place, the doors and windows can be easily and quickly installed.

Looking again to FIG. 5, which illustrates the glass door elements 56, it is seen that a pair of vertically spaced mounting sleeves 138 are provided at their rear vertical edge. As best shown in the enlarged view of FIG. 12, the sleeves 138 are slideably placed onto the mounting pins 136 to swingably mount the doors 56.

Similar pin mounting sleeves 140 are provided on the glass side windows 54, See FIG. 5. Looking again to FIG. 12, it will be seen that the sleeves 140 of the side windows 54 are also swingably supported on the mounting pins 136, just below the door sleeves 138. Preferably, the side windows 54 are installed on the mounting pins 136 first and the door members 56 are installed thereafter. This mounting structure permits either doors and/or side windows to easily be installed and/or removed. Looking again to FIGS. 5 and 8, there is illustrated the door latching structure used on the glass doors 56. Each door member 56 is equipped with a simple and conventional latch 142 that engages a bolt 144 mounted on the front leg member 30.

Turning now to FIG. 6, there is illustrated the flexible windshield 58, doors 64 and side and rear window elements 62 and 60. The flexible windshield 58 is carried in a frame 144 that allows it to be secured to the front leg members 30 with bolts or similar fasteners as is the glass windshield 50. Each flexible door 64 includes a fabric framework 146 within which the flexible window 148 is mounted. To retain their shape, each door 64 is provided with a metal rod 150 around its perimeter to which the fabric 146 is attached. Each door 64 is also provided with pin mounting sleeves 138 similar to those provided on the glass doors 56. These sleeves 138 permit the doors 64 to be swingably and removably mounted on the mounting pins 136 carried on the center leg members 130. Each flexible door member 64 can be equipped with a conventional simple slam latch that would engage a striker plate mounted on the front leg member 30.

Figures 10, 13, 14, 15:
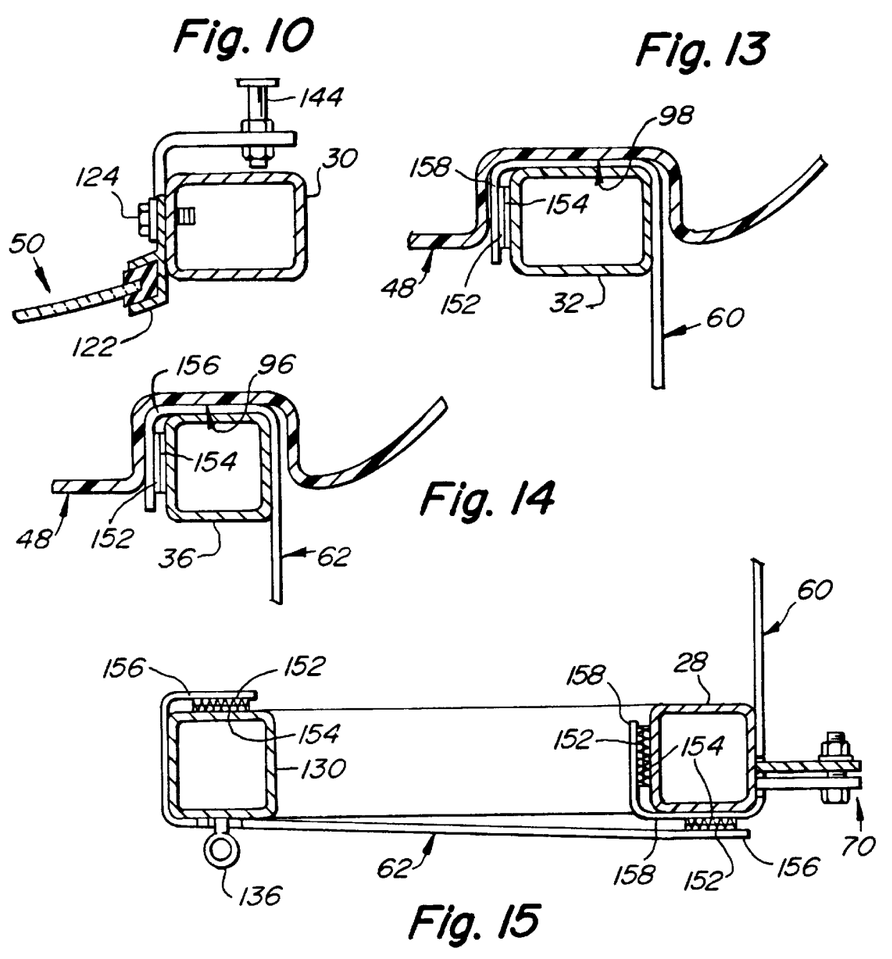
FIG. 10 is an enlarged view taken along lines 10—10 of FIG. 6 illustrating the structure that attaches the windshield to a first leg member.
FIG. 13 is an enlarged view taken along lines 13—13 of FIG. 6 and illustrating the Velcro™ hook and pile strips used to attach the top flap of the flexible rear window to the rear cross member.
FIG. 14 is an enlarged view taken along lines 14—14 of FIG. 6 and illustrating the Velcro™ hook and pile strips used to attach the top flap of the flexible side window to the roof support member.
FIG. 15 is an enlarged view taken along lines 15—15 of FIG. 6 and illustrating the Velcro™ hook and pile strips used to attach the vertical flaps of the flexible rear and side windows to the rear and center leg members.

As shown in detail in FIGS. 13 through 15, Velcro™, which is a registered trademark of Velcro Industries, Amsterdam, Holland, or similar synthetic strips with hook and loop attaching surfaces 152 and 154 are utilized to allow the flexible side and rear windows 62 and 60 to be easily and quickly installed or removed. One of the synthetic attaching strips, preferably the hook strips 152, are secured to the fabric of the windows 60 and 62. The strips 152 are attached to the side, top and bottom flaps 156 of the side windows 62, See FIGS. 6, 14 and 15. Similarly, hook attaching strips 152 are attached to the side and top flaps 158 of the rear window 60, See FIG. 6. The loop attaching strips 154 are secured, as with an adhesive, to the surfaces of the center and rear leg members 130 and 28, rear cross member 32 and rear portions of the fore-and-aft extending roof supports 36. Attaching loop strips 154 are also secured to the outer surface of the vertically extending sides of the rear window flap 158, See FIG. 15.

To install either the rear and/or side windows 60, 62, the roof member 48 should be removed from the framework 26. If a flexible rear window 60 is to be installed, it should be installed prior to the installation of the side windows 62. Installation of the rear windows 60 requires that the top flaps 158 with the attaching hook strips 152 first be wrapped around the first cross member 32, the side flaps 158 then be wrapped around the first leg members 28 and then attached to the loop strips 154. If side windows 62 are not to be installed, then the roof member 48 would be secured to the top face 46 of the framework 26. When the roof member 48 is secured in place, the laterally extending rear channel 98 would seat on the first cross member 32 and help secure the hook strips 152 on the rear window 60 with the loop strips 154 on the cross member 32, See FIG. 13.

When side windows 62 are to also be installed, their side flaps 156 with the hook strips 152 are wrapped around the inside vertical surfaces of the center leg members 130 so that the hook strips 152 engage the loop strips 154 which are secured to the center leg members 130, See FIG. 15. The top flaps 156 of the side windows 62 would similarly be wrapped around the roof supports 36 so that the hook strips 152 which are attached to the top flaps 156 of the side windows 62 would engage the loop strips 154 secured to the roof support members 36, See FIG. 14.

The rear vertical edge of the side window 62 with the hook strips 152 would then be engaged with the loop strips 154 attached to the outer vertical surface of the rear window 60. Should no rear window 60 be used, then the loop strips 154 would be secured to the rear leg members 28. After the side windows 62 are attached, the roof member 48 would be installed and, as shown in FIG. 14, the fore-and-aft channel 96 of the roof member 48 would seat on the top flap 156 of the side window 62. Openings 160 are also provided in the side windows 62 to allow the mounting pins 136 to project outside of the side windows 62. Accordingly, the flexible side windows 62 would be installed before the doors 64.

Figure 16:
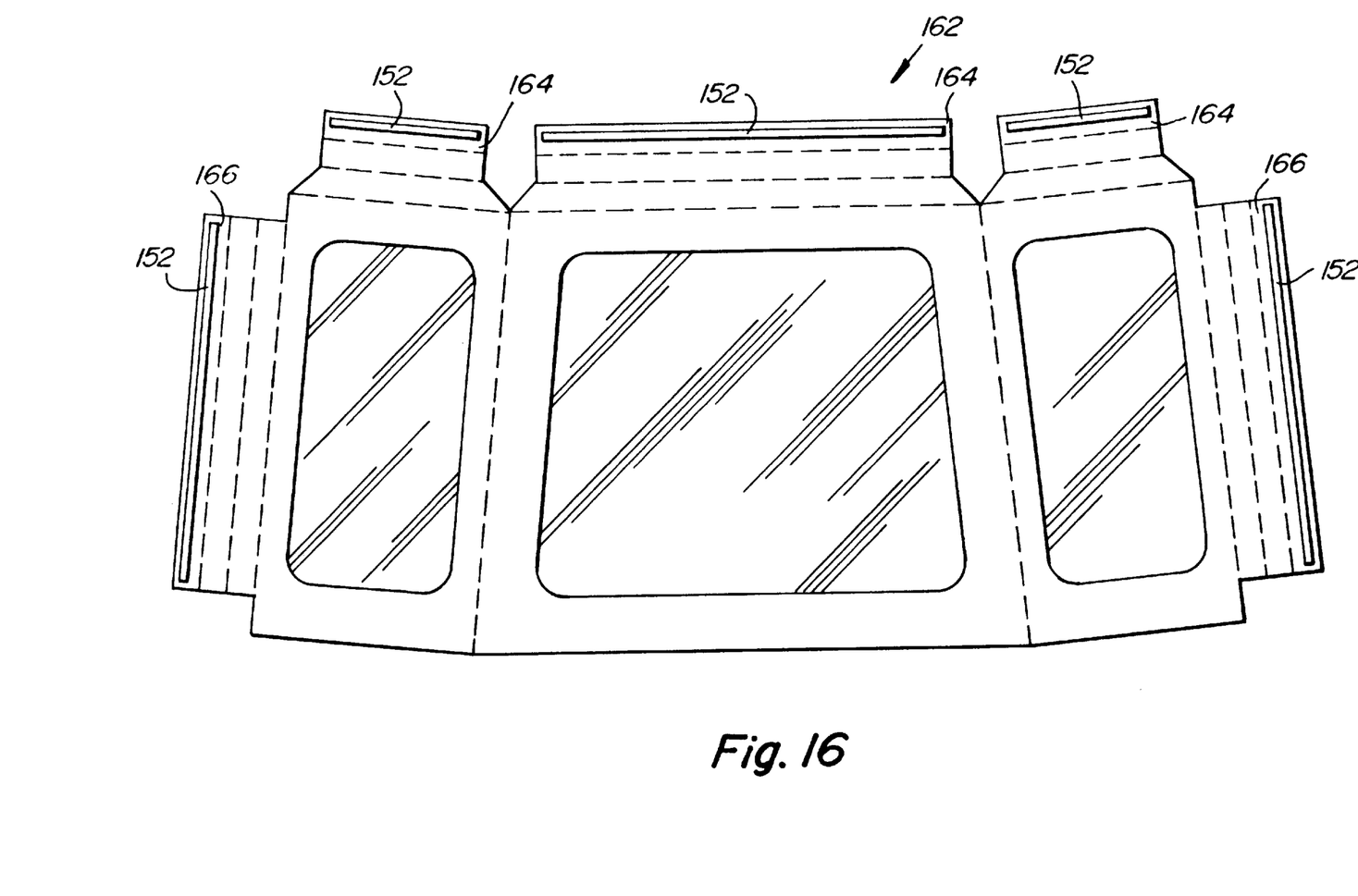
FIG. 16 is a front view of an alternative one-piece flexible rear window and side window combination.

An alternative flexible one-piece combination of side and rear windows 162 is illustrated in FIG. 16. This single fabric and flexible window part 162 would include hook strips 152 along its top and side flaps 164 and 166 that would respectively be wrapped around the first cross member 28, the roof support members 36 and center leg members 130 to engage loop strips attached to those members in a manner essentially as shown in FIGS. 13, 14 and 15.

Figure 2:
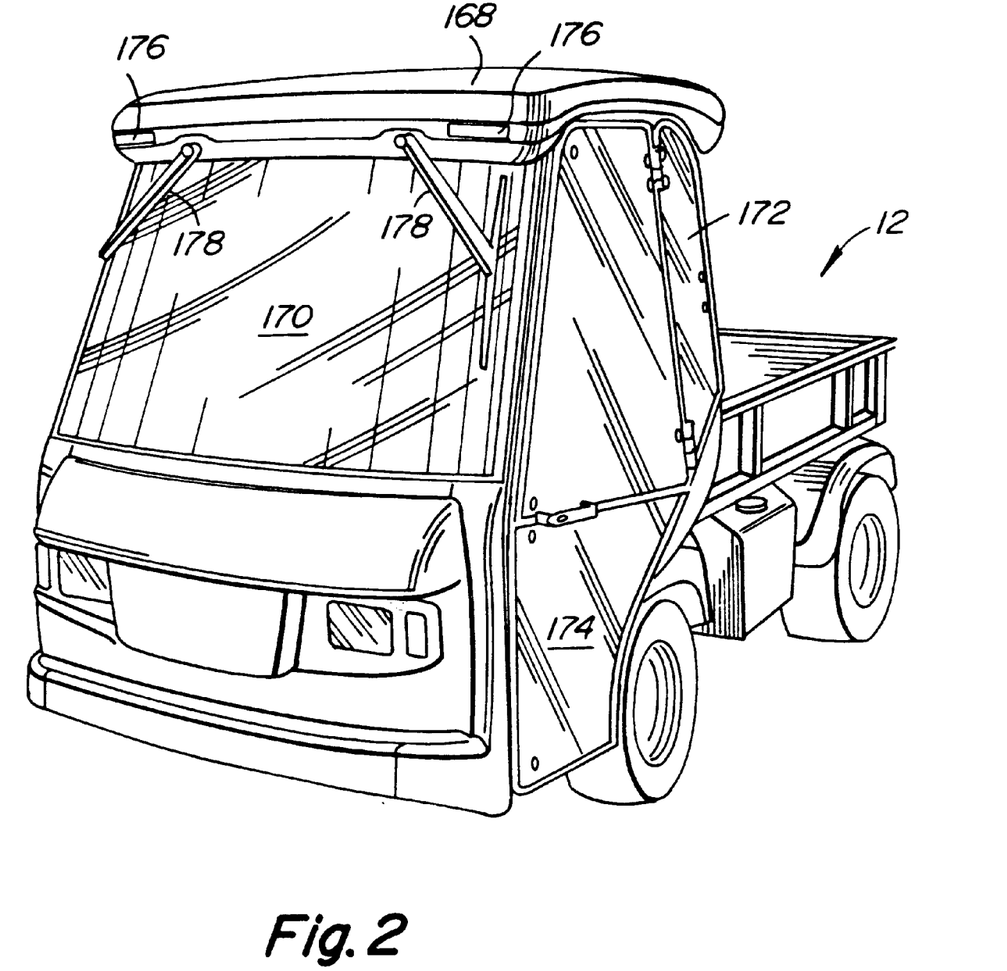
FIG. 2 is an elevated left front perspective view of a utility vehicle upon which the modular operator enclosure assembly has been installed.

Illustrated in FIG. 2 is the utility vehicle 12 upon which the modular operator enclosure has been installed. It also utilizes the rear, front and center leg members, which are not shown, to provide a framework upon which a roof member 168, glass windshield 170, glass side windows 172 and glass doors 174 have been installed. The roof member 168 has been optionally provided with turning lights 176 and windshield wipers 178. While not illustrated, a rear window has also been installed.

The modular design of the present operator enclosure permits a vehicle to be equipped with a wide variety of enclosure configurations. It can include only the rear roll-over protection structure or a combination of rear and forward leg members, cross members and roof supports to provide front and rear roll-over protection structures. To that framework can then be selectively added the roof member, a windshield, rear window, side window and/or doors. As cost, weather or use conditions dictate and/or change, flexible or glass windows and/or doors can be selected.

The compatibility of the modular components allows various elements to be selected initially or later. The modular construction permits the elements to be compactly shipped in a bundle form, rather than as a completed enclosure. The selection of enclosure configurations permits the dealer and user the option of personalizing the enclosure to their specific needs and/or uses.

What is claimed is:

1. A modular operator enclosure assembly usable with a wheeled vehicle having a frame and an operator station, the assembly being comprised of the following members:

a roll-over structure having a pair of first laterally spaced apart and generally vertically extending leg members removably attachable to the frame with a first cross member extending laterally therebetween;

a pair of second laterally spaced apart and generally vertically extending leg members removably attachable to the frame;

first and second fore-and-aft extending support members interconnecting respective pairs of the first and second leg members, and a second laterally extending cross member provided between the second leg members, said leg, support and cross members providing an operator enclosure framework having top, front, rear and left and right faces for removably receiving respectively roof, front window, rear window, left side and right side members.

2. The invention defined in claim 1 wherein the framework has removably secured to the top face thereof a roof member with any of the following:

headlights, turn signals, or an emergency beacon.

3. The invention defined in claim 1 wherein a roof member is removably securable with the first and second cross members.

4. The invention defined in claim 1 wherein the framework has removably secured to the top face thereof a roof member with any of the following:

a heater an air conditioner or a ventilation fan.

5. The invention defined in claim 1 wherein the framework has removably secured to the top face thereof a roof member with either of the following modules:

a windshield wiper module for a front window member or a windshield wiper module for a rear window member.

6. A modular operator enclosure assembly usable with a wheeled vehicle having a frame and an operator station, the assembly being comprised of the following members:

a roll-over structure having a pair of first laterally spaced apart and generally vertically extending leg members removably attachable to the frame with a first cross member extending laterally therebetween;

a pair of second laterally spaced apart and generally vertically extending leg members removably attachable to the frame;

first and second fore-and-aft extending support members interconnecting respective pairs of the first and second leg members;

a second laterally extending cross member provided between the second leg members, said leg, support and cross members providing an operator enclosure framework having top, front, rear and left and right faces for removably receiving respectively roof, front window, rear window, left side and right side members, with the right side face having removably secured thereto at least one of the following interchangeable members:

a door member having a metal frame, a door member having a flexible frame, a door member having a glass window or a door member having a flexible window.

7. A modular operator enclosure assembly usable with a wheeled vehicle having a frame and an operator station, the assembly being comprised of the following members:

a roll-over structure having a pair of first laterally spaced apart and generally vertically extending leg members removably attachable to the frame with a first cross member extending laterally therebetween;

a pair of second laterally spaced apart and generally vertically extending leg members removably attachable to the frame;

first and second fore-and-aft extending support members interconnecting respective pairs of the first and second leg members;

a second laterally extending cross member provided between the second leg members, said leg, support and cross members providing an operator enclosure framework having top, front, rear and left and right faces for removably receiving respectively roof, front window, rear window, left side and right side members, with the front face having removably secured thereto at least one of the following interchangeable members:

a window member with a generally rigid frame and glass window panel or a window member with a flexible frame and flexible window panel.

8. The invention defined in claim 7 wherein the framework removably supports a windshield wiper module for use with the front window panel.

9. The invention defined in claim 7 wherein a rear window is removably supported at the rear face of the framework.

10. The invention defined in claim 9 wherein the framework removably supports a windshield wiper module for use with the rear window.

11. A modular operator enclosure assembly usable with a wheeled vehicle having a frame and an operator station, the assembly being comprised of the following members:

a roll-over structure having a pair of first laterally spaced apart and generally vertically extending leg members removably attachable to the frame with a first cross member extending laterally therebetween;

a pair of second laterally spaced apart and generally vertically extending leg members removably attachable to the frame;

first and second fore-and-aft extending support members interconnecting respective pairs of the first and second leg members;

a second laterally extending cross member provided between the second leg members, said leg, support and cross members providing an operator enclosure framework having top, front, rear and left and right faces for removably receiving respectively roof, front window, rear window, left side and right side members, with the left side face having removably secured thereto at least one of the following interchangeable members:

a door member having a metal frame, a door member having a flexible frame, a door member having a glass window or a door member having a flexible window.

12. A modular operator enclosure assembly usable with a wheeled vehicle having a frame and an operator station, the assembly being comprised of the following members:

a roll-over structure having a pair of first laterally spaced apart and generally vertically extending leg members removably attachable to the frame with a first cross member extending laterally therebetween;

a pair of second laterally spaced apart and generally vertically extending leg members removably attachable to the frame;

first and second fore-and-aft extending support members interconnecting respective pairs of the first and second leg members;

a second laterally extending cross member provided between the second leg members;

said leg, support and cross members providing an operator enclosure framework having top, front, rear and left and right faces for removably receiving respectively roof, front window, rear window, left side and right side members, with the rear face having removably secured thereto at least one of the following interchangeable members:

a window member with a generally rigid frame and glass window panel or a window member with a flexible frame and flexible window panel.

13. A modular operator enclosure assembly usable with a wheeled vehicle having a frame and an operator station, the assembly being comprised of the following members:

a roll-over structure having a pair of first laterally spaced apart and generally vertically extending leg members removably attachable to the frame with a first cross member extending laterally therebetween;

a pair of second laterally spaced apart and generally vertically extending leg members removably attachable to the frame;

first and second fore-and-aft extending support members interconnecting respective pairs of the first and second leg members;

a second laterally extending cross member provided between the second leg members, said leg, support and cross members providing an operator enclosure framework having top, front, rear and left and right faces for removably receiving respectively roof, front window, rear window, left side and right side members;

a third pair of generally vertically extending leg members removably attached with framework, one at each side thereof, and between respective pairs of first and second leg members, and a door member removably mounted for swinging movement on each side of the framework and on a third leg member.

14. The invention defined in claim 13 wherein the door members each include a metal frame and glass window.

15. The invention defined in claim 14 wherein a side window is adapted to be removably received between one pair of first and third leg members.

16. The invention defined in claim 13 wherein the door members each include a flexible frame and flexible window.

17. The invention defined in claim 15 wherein the side window is flexible and attachable to the first and third leg members by hook and loop strips.

18. The invention defined in claim 15 wherein the side window is flexible and is attachable to a support member by hook and loop strips.

19. A modular operator enclosure assembly usable with a wheeled vehicle having a frame and an operator station, the assembly being comprised of the following members:

a roll-over structure having a pair of first laterally spaced apart and generally vertically extending leg members removably attachable to the frame with a first cross member extending laterally therebetween;

a pair of second laterally spaced apart and generally vertically extending leg members removably attachable to the frame first and second fore-and-aft extending support members interconnecting respective pairs of the first and second leg members;

a second laterally extending cross member provided between the second leg members, said leg, support and cross members providing an operator enclosure framework having top, front, rear and left and right faces for removably receiving respectively roof, front window, rear window, left side and right side members, and being removably secured to the left side face is at least one of the following interchangeable members comprised of:
a door member having a metal frame,
a door member having a flexible frame,
a door member having a glass window or
a door member having a flexible window;

to the right side face is at least one of the following interchangeable members comprised of:
a door member having a metal frame,
a door member having a flexible frame,
a door member having a glass window or
a door member having a flexible window;

to the top face is a roof member;

to the front face is at least one of the following interchangeable members comprised of:
a window with a generally rigid frame and glass window panel or
a window with a flexible frame and flexible window panel, and to the rear face is at least one of the following interchangeable members comprised of:
a window with a generally rigid frame and glass window panel or
a window with a flexible frame and flexible window panel.

20. The invention defined in claim 19 wherein the roof member is removably securable with the support members.

21. The invention defined in claim 20 wherein the roof member is also removably securable with the first and second cross members.

22. The invention defined in claim 19 wherein the framework supports a windshield wiper module for use with the front window.

23. The invention defined in claim 19 wherein a third pair of generally vertically extending leg members are removably attachable with the frame, one at each side of the framework and between one pair of first and second leg members, and the door member is removably mounted for swinging movement on one of the third leg members.

24. The invention defined in claim 23 wherein a side window is removably mounted between one first and one third leg member.

25. The invention defined in claim 19 wherein the framework supports a windshield wiper module for use with the window on the rear face.

26. The invention defined in claim 19 wherein turn signal lights are mounted to the roof member for use with the vehicle.

27. The invention defined in claim 19 wherein headlights are mounted to the roof member for use with the vehicle.

* * * * *